United States Patent
Soros

[15] 3,677,392
[45] July 18, 1972

[54] APPARATUS FOR STORING PARTICULATE MATERIAL

[72] Inventor: Paul Soros, 1102 Oenoke Ridge, New Canaan, Conn. 06840

[22] Filed: Sept. 15, 1970

[21] Appl. No.: 72,382

[52] U.S. Cl. ........................................198/36, 198/91, 214/10
[51] Int. Cl. ................................................................B65g 65/28
[58] Field of Search....................198/36, 102, 78, 81, 82, 83, 198/84, 91; 214/10, 16, 152; 37/190, 190 B, 190 W, 192, 192 B, 192 W

[56] References Cited

UNITED STATES PATENTS 2,750,023   6/1956   Meissner..................................198/36

FOREIGN PATENTS OR APPLICATIONS 593,367   2/1934   Germany..............................37/192 R
513,512   10/1952   Belgium....................................198/36
437,769   12/1926   Germany................................198/102

Primary Examiner—Gerald M. Forlenza
Assistant Examiner—Frank E. Werner
Attorney—Hubbell, Cohen & Stiefel

[57] ABSTRACT

A stacker mechanism in a particulate material stockpiling arrangement is modified to extend over a stack and between an adjacent stacker on one side thereof and an adjacent stack on the opposite side thereof to enable elimination of its stacker feeding conveyor by permitting the modified stacker mechanism to be fed from the adjacent stacker.

4 Claims, 2 Drawing Figures

Patented July 18, 1972

3,677,392

INVENTOR
PAUL SOROS
BY Hubbell, Cohen & Stiefel
ATTORNEYS.

APPARATUS FOR STORING PARTICULATE MATERIAL

BACKGROUND OF THE INVENTION

1. Field of the Invention

The present invention relates to storage of particulate materials, such as coal, iron ore, grain and the like. More particularly, the invention relates to apparatus for transporting such materials to storage locations.

2. Discussion of the Prior Art

Particulate materials, such as metal ores, coal, grains and the like, are stockpiled in large elongated outdoor stacks which usually extend in a longitudinal direction over relatively long distances. The stacks are formed in parallel rows between mechanized equipment which operates to transport the particulate material to and from the stacks. Material to be stockpiled is delivered to a storage location by devices called "stackers" and, retrieval thereof from the stacks is performed by devices called "reclaimers". Each stacker and reclaimer is movable between the stacks along the length thereof and material is fed to the stackers and from the reclaimers by conveyor devices which extend along the length of the stacks. Ordinarily, a stacker and a reclaimer each with an associated conveyor device are provided between stacks.

Stackers, reclaimers and conveyors are in the nature of heavy, mechanized industrial equipment and involve items of significant size and expense. Accordingly, any improvement in the efficiency of a stockpiling scheme which reduces costs by eliminating equipment without impairing any of the functions of the stockpiling operation would be of major significance and of great value.

By the present invention there is enabled elimination of a conveyor mechanism by a simple structural modification, without discontinuing the function of the eliminated conveyor.

SUMMARY OF THE INVENTION

Briefly, the present invention may be described as an arrangement for stockpiling particulate material in stacks, said arrangement comprising a primary stacker fed from a conveyor, and a secondary stacker structured, in accordance with the present invention, to extend over an adjacent stack on one side thereof to receive material from said primary stacker for deposition upon an adjacent stack on the opposite side thereof thereby eliminating the need for a conveyor for said secondary stacker. A secondary stacker may be operatively located on both sides of each primary stacker.

BRIEF DESCRIPTION OF THE DRAWINGS

The present invention will be better understood by reference to the following detailed description of a preferred embodiment thereof taken in connection with the accompanying drawings wherein.

DETAILED DESCRIPTION OF THE PREFERRED EMBODIMENT

Figure 1:
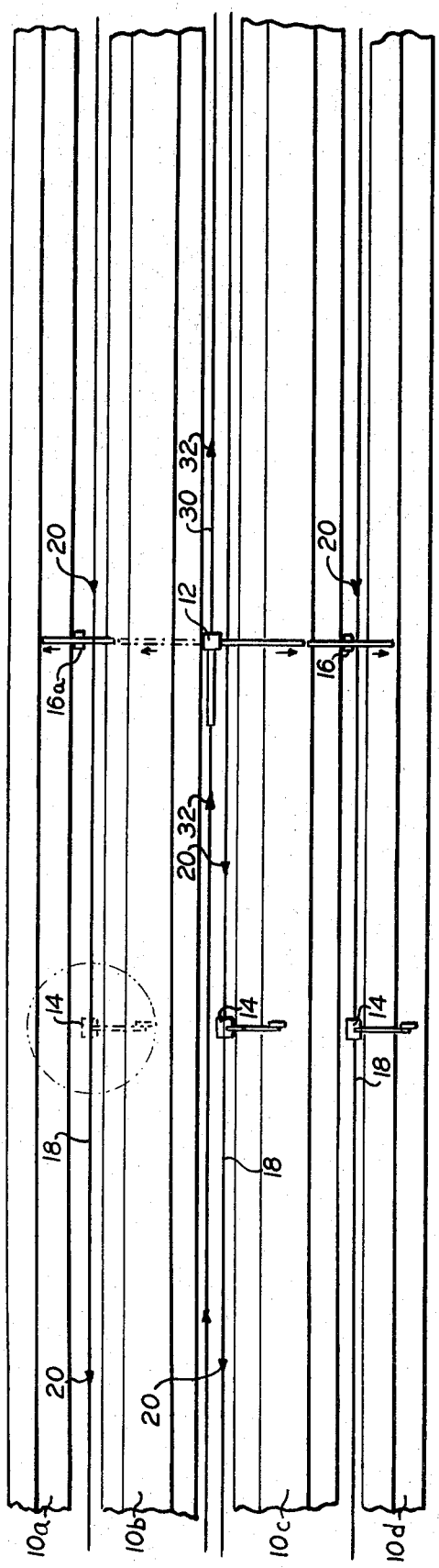
FIG. 1 is a plan view of a stockpiling arrangement in accordance with the present invention depicting a plurality of stacks of particulate material and schematically showing stackers, reclaimers and conveyors.

As shown in FIG. 1, the particulate material to be stockpiled is arranged in a plurality of elongated parallel stacks generally designated by the numeral 10, there being four such stacks labeled 10a, 10b, 10c and 10d, shown in FIG. 1. Between each adjacent pair of stacks 10 there is provided a stacker and a reclaimer. Thus, a primary stacker 12 and a reclaimer 14 are located between the stacks 10b and 10c; reclaimers 14 are located between stacks 10a and 10b, and between stacks 10c and 10d; and secondary stackers 16, which are constructed in accordance with the principles of the present invention, are located between stacks 10a and 10b, and between stacks 10c and 10d.

Each of the reclaimers 14 operates in association with a conveyor 18 in a manner whereby particulate material which is to be removed from the stacks 10 is initially engaged for retrieval by the reclaimers 14 and then deposited upon a conveyor 18 by which it is transported to the ends of the stacks 10, as indicated by the arrows 20, for delivery to a desired location. The reclaimers 14 and the conveyors 18 are constructed in accordance with known principles and are conventional in their structure and operation. Since the reclaimers 14 do not constitute structure which is a direct part of the present invention, they are shown in dotted form as comprising a bucket wheel pickup member 22 which initially engages the particulate material to be retrieved from a stack 10 and deposits it upon an endless belt conveyor 24 which operates to transfer the particulate material to a position above a conveyor 18. After transfer to conveyor 18, either by gravity feed or by other conventional means, the particulate material is then transported for ultimate removal from the stockpile.

Each of the reclaimers 14 is mounted for longitudinal travel along the length of the stacks 10 upon tracks 26 thereby enabling retrieval of particulate material by a single reclaimer 14 along the entire length of a pair of stacks 10. Additionally, the reclaimers 14 have a swivel mechanism 28 which permits rotation of the bucket wheel 22 and its associated endless belt conveyor 24 in a manner whereby a single reclaimer 14 may retrieve particulate material on both sides thereof from a pair of adjacent stacks 10. Thus, as will be noted from FIG. 1, the reclaimer 14 which is located for operation between the stacks 10a and 10b is operable for retrieval of particulate material from both said stacks.

It should be noted that the outboard stacks 10a and 10d of the stockpile are made with approximately one-half the width of the inboard stacks 10b and 10c. The reclaimer 14 between stacks 10a and 10b is constructed to extend across the full width of stack 10a and across approximately half the width of stack 10b. Approximately half the widths of stockpiles 10b and 10c are covered by the reclaimer 14 which is located therebetween, with the full width of stack 10d and half the width of stack 10c being covered by the reclaimer 14 which is located between these stacks. Accordingly, it will be seen that the entire width of the stockpile shown in FIG. 1 may be covered by three reclaimers 14.

In a conventional stockpiling arrangement, the stackers are usually operated in a generally similar but reverse manner as the reclaimers in the sense that each stacker is mounted to deposit particulate material on a pair of adjacent stacks on opposite sides thereof. Thus, the primary stacker 12, which is conventional in its design and operation, receives particulate material to be deposited for storage upon a stack 10 from a conveyor 30 which operates as indicated by the arrows 32 to introduce particulate material into the stockpiling arrangement for storage. The primary stacker 12 is mounted for longitudinal travel along the entire length of the stockpile upon tracks 34. A tripper arrangement (not shown) which is fully conventional operates in accordance with known principles to elevate the particulate material from the conveyor 30 onto an endless belt conveyor 36 which is driven to deposit onto the stacks 10 the particulate material received from the conveyor 30. The primary stacker 12 includes an L-shaped frame member 38 swivelly mounted upon a lower frame 40 by a turntable 42. Support struts 44 extend from the frame member 38 to the endless belt conveyor 36 and to a counterweight 46 to provide appropriate support for the cantilevered conveyor 36. By rotation of the frame 38 upon the turntable 42 the conveyor 36 may be positioned to deposit particulate material on opposite sides thereof in a manner well known to those skilled in the art. The swivel mounting comprising turntable 42 is optional since conventional arrangements may include a pair of fixed conveyors 36 extending in opposite directions.

The secondary stackers 16 each comprise a frame member 50, which is mounted for longitudinal travel along the length of the stacks 10 upon tracks 54. In the embodiment shown, the frame member 50 includes a turntable 52, but this is optional and needed to enable the stacker 16 to bypass the reclaimer 14. In cases where bypassing need not occur, such as conventional arrangements where stackers and reclaimers are interchangeably operated on different tracks, a turntable 52 may not be necessary. An endless belt conveyor 56 is supportedly mounted upon the frame 50 and is adjustable with regard to position and orientation by actuation of control means which may comprise hydraulic elements 58, or other conventional devices such as winches or the like. It should be noted that conveyor means, such as the conveyors 18 or 30, are not provided beneath the secondary stackers 16.

The specific structural modification of the secondary stackers 16 which enables their operation in accordance with the principles of the present invention comprises an extended section 56a of the endless belt conveyor 56 which permits positioning thereof over a stack 10, e.g., either stack 10b or 10c, into operative relationship with the endless belt conveyor 36 of primary stacker 12 so that particulate material may be transferred from the conveyor 36 of stacker 12 to the conveyor 56 of stacker 16. Accordingly, the secondary stackers 16 may be individually charged through the primary stacker 12 by means of conveyor 30 thereby eliminating the necessity for separate conveyors to charge the secondary stackers 16.

In the practice of the present invention, the secondary stackers 16 and 16a may be generally constructed or modified in accordance with conventional manufacturing techniques to include the extended section 56a. The secondary stackers 16 are similar to known prior art stackers with regard to many of the specific details of their construction, with the important difference being that the stackers 16 and 16a of the present invention include the essential structural feature embodied in the extension 56a. Accordingly, it will be seen that the benefits of the invention may be derived by one skilled in the art in a quite efficient and expeditious manner without involving significant added expense.

Figure 2:
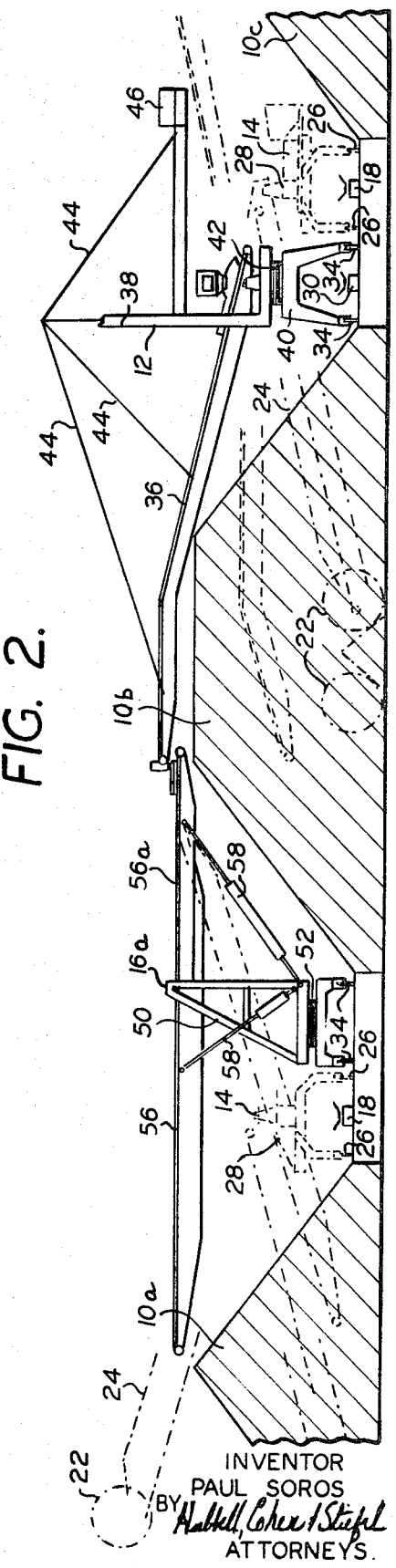
FIG. 2 is a cross sectional view of the stockpiling arrangement shown in FIG. 1.

It will be clear that in the operation of the device of the present invention particulate material to be deposited upon any of the stacks 10a-10d is introduced into the stockpiling arrangement shown in FIG. 1 initially through a single conveyor 30 which operates as an input feed source for the entire stockpile. Particulate material to be stored is introduced through the conveyor 30 and transferred to the primary stacker 12. If the particulate material is to be deposited upon the stack 10a, then the stackers 12 and 16a are placed in operative position, as shown in FIG. 2, and particulate material is transferred from the endless belt conveyor 36 onto the endless belt conveyor 56, specifically extension 56a thereof, and from there onto the stack 10a. If the particulate material is to be deposited upon either of the stacks 10b or 10c, this may be accomplished directly from the endless belt conveyor 36 by moving the stackers 12 and 16 to appropriate relative positions where stacker 12 does not feed either of the stackers 16 and 16a. If the particulate material is to be deposited upon the stack 10d then the stacker 12 may be swiveled to move the endless belt conveyor 36 to the right of the position shown in FIG. 2 so that it extends over the stack 10c into operative transferring relationship with the secondary stacker 16 (not shown in FIG. 2) which is located between the stacks 10c and 10d. The deposition of particulate material upon the stack 10d is accomplished in much the same manner as was described in connection with the stack 10a except that secondary stacker 16, which is identical in structure with the secondary stacker 16a depicted in FIG. 2, is utilized with the orientation of the endless belt conveyor 36 being reversed so that it extends over the stack 10c.

In many cases it will be found necessary to drive the primary stackers 12 and the secondary stackers 16 along the length of the stacks in unison. This will occur where deposition of particulate material is to be accomplished continuously while the stackers are in motion lengthwise of the stockpile. In such cases, any one of many well known conventional control arrangements (not shown) may be utilized to interlock the longitudinal movement of the stackers 12 and 16 along the tracks 34 in a manner well known to those skilled in the art.

Thus, it will be seen that as a result of the development of the present invention a four-stack stockpiling arrangement may be fed and supplied with particulate material to be stored through a single conveyor, such as the conveyor 30, with elimination of two such conveyors which would normally be required, e.g., between stacks 10a and 10b and between the stacks 10c and 10d, in a conventional stockpiling arrangement not organized in accordance with the present invention. Of course, it will be apparent that specific stockpiling arrangements other than the one specifically described may be derived within the purview of the present invention. For example, where desired it would be possible to feed only one secondary stacker 16 from a primary stacker 12.

It will, therefore, be apparent that by utilization of the present invention there is enabled significant savings in cost and material without impairing or diminishing the operative functions of the stockpiling arrangement. Furthermore, it will be seen that this is accomplished in an advantageously simplified and relatively inexpensive manner due to the fact that the modifications to the structure of the secondary stackers 16 do not involve complex redesign and can be readily accomplished by anyone skilled in the art.

It will be understood that the above described embodiment of the present invention is merely illustrative of the principles thereof and that numerous other modifications and embodiments of the invention may be derived within the spirit and scope thereof.

What is claimed is:

1. Apparatus for stockpiling particulate material in three spaced apart longitudinally extending parallel stacks, comprising:
   a. a primary stacker including a base positioned for movement between the first and second of said stacks and an endless conveyor swivelly mounted on said base for positioning over said first and second stack for feeding thereof;
   b. a second endless conveyor, said second endless conveyor extending parallel to said stacks between said first and second stack for supplying particulate material to said primary stacker means; and
   c. a secondary stacker means including a base positioned for movement between said second and third stacks and an endless conveyor mounted on said base, said endless conveyor spanning said second and third stacks and having a receiving end and a discharge end, said receiving end being positionable over said second stack in receiving relation to said conveyor on said primary stacker when said primary stacker is aligned with said secondary stacker and said conveyor of said primary stacker overlies said second stack, whereby the particulate material for all three stacks is supplied into said apparatus by said second endless conveyor.

2. The apparatus of claim 1, wherein the endless conveyor of said secondary stacker is swivelly mounted on said base.

3. The apparatus of claim 1 for stockpiling said three stacks plus a fourth stack parallel to and spaced from said first stack on the opposite side from said second stack, said apparatus further comprising a second secondary stacker including a base positioned for movement between said first and fourth stacks and an endless conveyor mounted on said base, said endless conveyor spanning said first and fourth stacks and having a receiving end and a discharge end, said receiving end being positionable over said first stack in receiving relation to said conveyor and said primary stacker when said primary stacker is aligned with said second secondary stacker and said conveyor of said primary stacker overlies said first stack, whereby the particulate material for all four stacks is supplied into said apparatus by said second endless conveyor.

4. The apparatus of claim 3, wherein the endless conveyor of said secondary stackers are swivelly mounted on their respective bases.

* * * * *